May 7, 1935.    G. J. STREZYNSKI    2,000,459

SELF DRAINING CENTRIFUGAL BOWL

Filed March 29, 1933

INVENTOR

George J. Strezynski

BY

Busser and Harding

ATTORNEYS.

WITNESS:

Robt. P. Kitchel.

Patented May 7, 1935

2,000,459

UNITED STATES PATENT OFFICE 2,000,459

SELF-DRAINING CENTRIFUGAL BOWL

George J. Strezynski, Poughkeepsie, N. Y., assignor to The De Laval Separator Company, New York, N. Y., a corporation of New Jersey Application March 29, 1933, Serial No. 663,295

10 Claims. (Cl. 233—46)

My invention relates to centrifugal bowls of the self draining type.

The object of my invention is to provide a self draining bowl from which liquid will not escape during rotation and which on stoppage of the bowl will deliver the liquid that drains from it at a great distance from the center.

It is known to provide centrifugal bowls with drainage passages leading from the bottom of the bowl at one or more points between the center and the periphery of the bowl and terminating beneath the bowl. In order to provide a centrifugal force that will prevent escape of liquid while the bowl is in operation these outlets have been arranged to terminate at a distance from the center less than the radius of those other outlets from the bowl through which, during the normal centrifugal process, the separated or purified constituents are discharged. This often results in spillage of liquid on to the bearing with resultant damage thereto.

I have discovered that if drainage channels are positioned to start from a point distant from the center, extend through a zone nearer to the center than the normal outlet from the bowl, and terminate distant from the center, there will be no discharge through them while the bowl is rotating at normal speed, and yet the bowl will drain completely when stopped.

In the accompanying drawing:—

$a$ is the shell of a centrifugal bowl having a top $b$ and containing a tubular shaft $c$, a nest of separating discs $d$ and a top disc $e$. The discharge for heavy liquid is at $f$ and that for light liquid is at $g$. A spindle $h$, revolving in bearing $i$, supports and drives the bowl.

Figure 1:
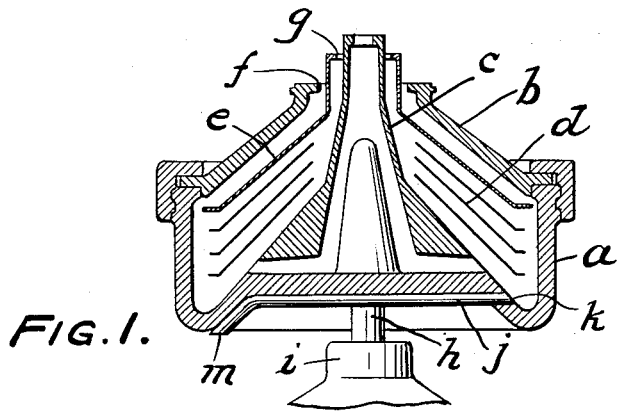
Fig. 1 is a vertical section, a little one side of the center, through a bowl having my improved drain.
Figure 2:
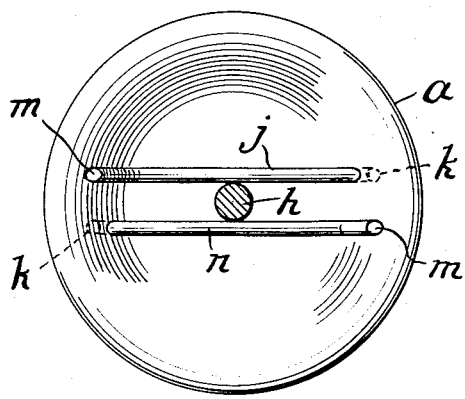
Fig. 2 is a bottom view of the bowl of Fig. 1.

In the construction shown in Figs. 1 and 2, a drain tube $j$ starts from a point $k$ near one side of the bowl, extends as close as possible to the spindle $h$ and terminates in a downturned end at $m$ near the opposite side of the bowl. Except for a slight bend near the outlet end, the tube is straight, so that, if it becomes clogged, it can be easily cleaned by forcing through it a flexible wire. A similar drain tube $n$ starts from a point diametrically opposite to the starting point of the other tube and terminates at a point diametrically opposite to the terminus of the other tube.

Figure 3:
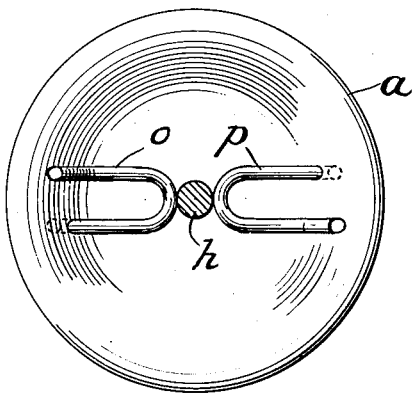
Fig. 3 is a bottom view of a bowl having an alternative type of discharge.

In the alternative form shown in Fig. 3, the drain tubes $o$ and $p$ start from the same points as in Figs. 1 and 2, but instead of extending beyond the center to the opposite side, they extend as close as possible to the center and bend back and terminate near to their starting points.

Figure 4:
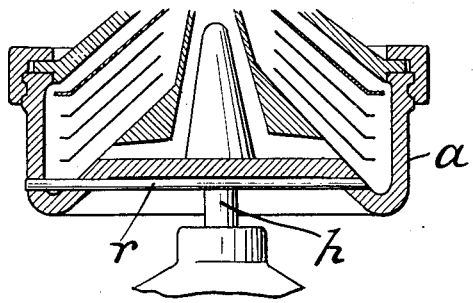
Figs. 4 and 5 are partial vertical sections showing other alternative constructions.
Figure 5:
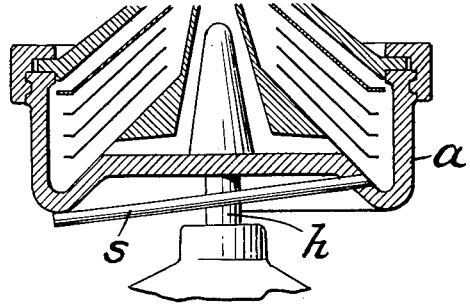

In the constructions shown in Figs. 4 and 5, the drainage channels $r$ and $s$ are straight so as to permit cleaning with a rigid rod.

For purposes of balance it is preferable to use two diametrically oppositely located tubes, as shown and described; but one or more may be used.

If the bowl be a centrifugal separator and therefore provided, as shown, with a plurality of outlets, functioning during the separating operation, for the relatively heavy and light separated constituents, the terminus of the drain channel may be at any distance from the bowl's rotation axis, provided that, between its ends, it extends inward to a point nearer the bowl's rotation axis than the outlet, e. g., the weir $f$, for the heavier separated liquid and, in most cases also, nearer to said rotation axis than the outlet, e. g., the weir $g$, for the lighter separated liquid. If the bowl be a purifier provided with but one liquid outlet functioning during centrifugation, the drain channel may terminate at any distance from the bowl's axis, provided that, between its ends, it extends inward to a point nearer the bowl's rotation axis than said outlet. In any type of bowl, it is often preferable, in order to completely clear the bearings, to locate the terminus of the drain channel at a distance from said axis not greatly varying from the distance of its inlet from said axis.

It is not required, or indeed desirable, that the drain inlet shall be located at the extreme periphery of the bowl, nor is it required that said inlet shall be actually in its bottom, but it should extend from that vicinity; that is, from what may be called its peripheral bottom portion.

What I claim and desire to protect by Letters Patent is:

1. The combination, with a centrifugal bowl provided with a regular discharge outlet adapted to function during centrifugation, a bowl driving spindle extending downward from the bowl and a spindle bearing beneath the bowl, of a drain channel rotatable with the bowl extending from the bottom peripheral portion of the bowl to a point nearer its axis of rotation than said outlet and thence extending away from said axis and terminating a substantial distance therefrom.

2. The combination, with a centrifugal separator bowl provided with regular discharge outlets for respectively heavier and lighter constituents, a bowl driving spindle extending downward from the bowl and a spindle bearing beneath the bowl, of a drain channel rotatable with the bowl extending from the bottom peripheral portion of the bowl to a point nearer the rotation axis of the bowl than the outlet for the heavier constituent and thence extending away from said axis and terminating a substantial distance therefrom.

3. The combination, with a centrifugal separator bowl provided with regular discharge outlets for respectively heavier and lighter constituents, a bowl driving spindle extending downward from the bowl and a spindle bearing beneath the bowl, of a drain channel rotatable with the bowl extending from the bottom peripheral portion of the bowl to a point nearer the rotation axis of the bowl than the outlet for the lighter constituent and thence extending away from said axis and terminating a substantial distance therefrom.

4. The combination, with a centrifugal bowl having a liquid outlet comprising a weir over which liquid is adapted to outflow from the bowl during the centrifugal operation, a bowl driving spindle extending downward from the bowl and a spindle bearing beneath the bowl, of a drain channel rotatable with the bowl extending from the bottom peripheral portion of the bowl inward to a point nearer the rotation axis of the bowl than said weir and thence extending outward and terminating at a substantial distance from its point of nearest approach to said axis.

5. The combination, with a centrifugal bowl having liquid outlets for respectively heavier and lighter separated constituents located at different distances from the rotation axis of the bowl, each outlet comprising a weir over which liquid is adapted to flow, a bowl driving spindle extending downward from the bowl and a spindle bearing beneath the bowl, of a drain channel rotatable with the bowl extending from the bottom peripheral portion of the bowl inward to a point nearer the rotation axis of the bowl than the weir over which the heavier liquid constituent is adapted to flow and thence extending outward and terminating at a substantial distance from its point of nearest approach to said axis.

6. The combination, with a centrifugal bowl having liquid outlets for respectively heavier and lighter separated constituents located at different distances from the rotation axis of the bowl, each outlet comprising a weir over which liquid is adapted to flow, a bowl driving spindle extending downward from the bowl and a spindle bearing beneath the bowl, of a drain channel rotatable with the bowl extending from the bottom peripheral portion of the bowl inward to a point nearer the rotation axis of the bowl than the weir which is nearest to said axis and thence extending outward and terminating a substantial distance beyond the radius of the weir which is more distant from said axis.

7. The combination, with a centrifugal bowl having a liquid outlet comprising a weir over which liquid is adapted to outflow from the bowl during the centrifugal operation, a bowl driving spindle extending downward from the bowl and a spindle bearing beneath the bowl, of a drain channel rotatable with the bowl extending from the bottom peripheral portion of the bowl inward to a point nearer the rotation axis of the bowl than said weir and thence extending outward and terminating at a distance from said axis not substantially less than the distance therefrom of its inlet.

8. The combination, with a centrifugal bowl provided with a regular discharge outlet adapted to function during centrifugation, a bowl driving spindle extending downward from the bowl and a spindle bearing beneath the bowl, of a drain channel rotatable with the bowl extending from the bottom peripheral portion of the bowl to a point nearer its axis of rotation than said outlet and thence extending away from said axis and terminating at a point about diametrically opposite its inlet.

9. The combination, with a centrifugal bowl provided with a regular discharge outlet adapted to function during centrifugation, a bowl driving spindle extending downward from the bowl and a spindle bearing beneath the bowl, of a plurality of drain channels rotatable with the bowl extending from bottom peripheral portions of the bowl to points nearer the axis of rotation of the bowl than said outlet and thence extending away from said axis and terminating at a substantial distance therefrom, said drain channels being diametrically oppositely positioned.

10. The combination, with a centrifugal separator bowl provided with regular discharge outlets for respectively heavier and lighter constituents, a bowl driving spindle extending downward from the bowl and a spindle bearing beneath the bowl, of a drain channel extending from the bottom peripheral portion of the bowl through the bowl bottom, thence extending outside the bowl beneath its bottom toward the axis of rotation of the bowl and to a point nearer said axis than the outlet for the heavier constituent and thence extending away from said axis and terminating a substantial distance therefrom.

GEORGE J. STREZYNSKI.